US009886375B2

(12) United States Patent
Rumble

(10) Patent No.: US 9,886,375 B2
(45) Date of Patent: *Feb. 6, 2018

(54) AUTOMATED EXECUTION OF FUNCTIONAL TEST SCRIPTS ON A REMOTE SYSTEM WITHIN A UNIT TESTING FRAMEWORK

(71) Applicant: INTERNATIONAL BUSINESS MACHINES CORPORATION, Armonk, NY (US)

(72) Inventor: Philip G. Rumble, Spearwood (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 244 days.

This patent is subject to a terminal disclaimer.

(21) Appl. No.: 14/803,397

(22) Filed: Jul. 20, 2015

(65) Prior Publication Data
US 2015/0324276 A1 Nov. 12, 2015

Related U.S. Application Data

(63) Continuation of application No. 13/779,729, filed on Feb. 27, 2013, now Pat. No. 9,135,150.

(51) Int. Cl.
G06F 11/36 (2006.01)

(52) U.S. Cl.
CPC ...... *G06F 11/3692* (2013.01); *G06F 11/3664* (2013.01); *G06F 11/3684* (2013.01); *G06F 11/3688* (2013.01)

(58) Field of Classification Search
USPC ...................................... 714/38.14
See application file for complete search history.

(56) References Cited

U.S. PATENT DOCUMENTS 5,822,397 A 10/1998 Newman
6,473,794 B1* 10/2002 Guheen ............ H04L 41/22
709/223

(Continued)

FOREIGN PATENT DOCUMENTS

JP 2010026706 2/2010

OTHER PUBLICATIONS

"A System and Method for Management of Remote Test Case Execution", International Business Machines Corporation, published by IP.com (IPCOM000159185D), dated Oct. 12, 2007, 4 pages.

(Continued)

*Primary Examiner* — Kamini Patel
(74) *Attorney, Agent, or Firm* — David Zwick; Amy J. Pattillo

(57) ABSTRACT

Responsive to starting a unit testing test case specified in a unit testing framework on an originating system for running on at least one target, the originating system directs a software testing automation framework execute request within the unit testing test case to a remote system to execute a functional test script designated in the unit testing test case on the target on the remote system, the functional test script designating a functional test case to be run on the target to test the operating of one or more functions of the target. The originating system receives unit testing framework case results for the unit testing test case converted by a software testing automation copy request within the unit testing test case from results of the function test script running on the target.

18 Claims, 5 Drawing Sheets

(56) References Cited

U.S. PATENT DOCUMENTS

| | | | |
|---|---|---|---|
| 6,804,709 B2 | 10/2004 | Manjure et al. | |
| 7,673,179 B2 | 3/2010 | LaBanca et al. | |
| 7,702,766 B2* | 4/2010 | Weir | G06F 9/542 |
| | | | 709/223 |
| 7,725,772 B2 | 5/2010 | Proto | |
| 7,908,590 B1* | 3/2011 | Min | G06F 11/3684 |
| | | | 717/124 |
| 8,001,532 B1 | 8/2011 | Jakubiak et al. | |
| 2002/0116507 A1* | 8/2002 | Manjure | H04L 43/50 |
| | | | 709/229 |
| 2005/0144593 A1* | 6/2005 | Raghuvir | G06F 11/3688 |
| | | | 717/124 |
| 2006/0179363 A1 | 8/2006 | LaBanca et al. | |
| 2008/0320071 A1* | 12/2008 | Hoskins | G06F 11/3688 |
| | | | 709/202 |
| 2009/0024874 A1* | 1/2009 | Proto | G06F 11/3688 |
| | | | 714/38.14 |
| 2011/0131001 A1* | 6/2011 | Mathur | G06F 11/3664 |
| | | | 702/122 |
| 2012/0089875 A1* | 4/2012 | Faust | G06F 11/3688 |
| | | | 714/38.1 |
| 2012/0192153 A1* | 7/2012 | Venkatraman | G06F 11/3672 |
| | | | 717/124 |
| 2014/0245070 A1* | 8/2014 | Rumble | G06F 11/3692 |
| | | | 714/38.14 |
| 2016/0085666 A1* | 3/2016 | Jordan | H04L 41/0266 |
| | | | 714/38.1 |

OTHER PUBLICATIONS

Office Action, dated Nov. 22, 2014, U.S. Appl. No. 13/779,729, filed Feb. 27, 2013, In Re Rumble, 23 pages.
Final Office Action, dated Feb. 27, 2015, U.S. Appl. No. 13/779,729, filed Feb. 27, 2013, In Re Rumble, 21 pages.
Notice of Allowance, dated May 11, 2015, U.S. Appl. No. 13/779,729, filed Feb. 27, 2013, In Re Rumble, 19 pages.

* cited by examiner

```
public void runRTFTest(String scriptName, String
args) throws Exception{
    SimpleDateFormat format =
newSimpleDateFormat("yyyyMMddHHmmss");
Date date = new Date();
    String nowStr = format.format(date);
    Logger.getRootLogger().info("Logfile is
"+nowStr);

String cmd="java - classpath C:\\\\Progra~1\\\
\FUNCTI~1\\\\bin\\\\rational_ft.jr
com.rational.test.ft.rational_ft -datastore C:\\\
\DOCUME~1\\\\\rationalsdp\\\\workspace\\\\-
playback "+scriptName+" -rt.bring_up_logviewer \\
\"false\\\" -rt.log_format text -log " +nowStr;

if (null !=args) {
       cmd= cmd + " -args " + args;
    } cmd = cmd + " & set PROCESSRC=
%ERRORLEVEL% & exit %PROCESSRC%";

STAFProcess.execute (cmd, fTarget.getAddress());

STAFFSInterface fs = new STAFFSInterface();

String path = "C:\\\\DOCUME~1\\\\rationalsdp\\
\\workspace\\\\_logs\\\\"+nowStr+\\\
\rational_ft_log.txt;

String results = fs.getTextFile(fTarget, path);

if (results.contains(RFT_FAIL_CHAR_SEQUENCE))
       {
           Logger.getLogger
(RFTTestSuite.class).error(results);
           fail ("RFT TestScript Failed - "+ results);
       }
}
```

JUNIT TESTCASE CODE 300

SET THE UNIQUE FILE NAME FOR THE LOG FILE FOR EACH EXECUTION OF THE JUNIT TEST CASE 310

SPECIFY THE COMMAND TO BE EXECUTED ON THE REMOTE MACHINE UNDER TEST
- SPECIFIES RFT TEST SCRIPT LOCATION
- SETS OPTION TO NOT SHOW THE LOG VIEWER AT THE END OF THE TEST SCRIPT PLAYBACK
- OUTPUT LOG FILE SPECIFIED TO OUTPUT IN TEXT TO THE UNIQUE FILE NAME 312

SPECIFY THAT IF THE RFT TARGET FAILS IN ANY WAY, THE FAILURE WILL BE INCLUDED IN THE RFT LOG FILE 314

CALL TO STAF REQUESTING THE RFT TEST SCRIPT EXECUTION 316

CALL TO STAF TO OPEN A RETURN INTERFACE 318

SPECIFY THE LOCATION OF THE LOG FILE ON THE REMOTE SYSTEM 320

CALL STAF TO COPY THE RFT LOG FILE BACK TO THE TEST CONSOLE 322

EXAMINE THE CONTENTS OF THE JUNIT TESTCASE RESULT FOR A FAILED SIGNATURE AND CONVERT A FAILED RFT LOG FILE INTO A JUNIT TEST CASE RESULTS MARKED WITH ERRORS 324

AUTOMATED EXECUTION OF FUNCTIONAL TEST SCRIPTS ON A REMOTE SYSTEM WITHIN A UNIT TESTING FRAMEWORK

CROSS REFERENCE TO RELATED APPLICATIONS

This application is a continuation of commonly assigned U.S. patent application Ser. No. 13/779,729, filed Feb. 27, 2013, which is hereby incorporated herein by reference.

1. Technical Field

The embodiment of the invention relates generally to testing software in computing environments and particularly to fully automated execution of functional test scripts on a remote system within a unit testing framework.

2. Description of the Related Art

Many types of software targets, such as web or server applications, stand-alone computing applications, web services, computer program products, and user interfaces (UIs), need to be tested while operating. A test case of a software target represents code generated for testing whether one or more features of the software target is operating properly. A software testing framework provides services, libraries, or other tools for running a test case specified for the framework, on the target, collecting a result of running the test, and validating the collected results against expected results.

BRIEF SUMMARY

In a testing environment with a testing console running a unit testing framework, the target running remotely from the testing console, and the target requiring testing by a functional test script, there is a need for a method, system, and computer program product for a fully automated continuous integration test system that executes functional test script remotely, from the unit testing console running the unit testing framework, as unit testing framework test cases. In particular, there is a need for a method, system, and computer program product for executing rational functional test (RFT) test scripts remotely on a target, contained within a Java® Unit (JUnit) testing framework.

In one embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to specify a unique file name for a log file for each execution of a unit testing test case. The stored program instructions comprise program instructions to specify, in the unit testing test case, a location of a functional test script. The stored program instructions comprise program instructions to specify, in the unit testing test case, the unique file name for the log file for use by a remote system. The stored program instructions comprise program instructions, responsive to starting the unit testing test case specified in a unit testing framework on an originating system for running on at least one target, to direct a software testing automation framework execute request within the unit testing test case to the remote system to execute the functional test script designated in the unit testing test case on the target on the remote system, the functional test script designating a functional test case to be run on the target to test the operating of one or more functions of the target. The stored program instructions comprise program instructions to call the software testing automation framework on the remote system to open a return interface. The stored program instructions comprise program instructions to call the software testing automation framework on the remote system to copy the log file with the unique file name as unit testing framework results. The stored program instructions comprise program instructions to receive, by the originating system, the unit testing framework case result for the unit testing test case converted by a software testing automation copy request within the unit testing test case from results of the function test script running on the target, wherein the results comprise a test log specifying one or more differences between a baseline specified in the functional test script designated in the unit testing test case and one or more actual results achieved during testing of the functional test script on the target.

In another embodiment, a method is directed to, specifying, by one or more processors, a unique file name for a log file for each execution of a unit testing test case. The method is directed to specifying, by the one or more processors, in the unit testing test case, a location of a functional test script. The method is directed to specifying, by the one or more processors, in the unit testing test case, the unique file name for the log file for use by a remote system. The method is directed to, responsive to starting the unit testing test case specified in a unit testing framework on an originating system for running on at least one target, directing, by the one or more processors, a software testing automation framework execute request within the unit testing test case to the remote system to execute the functional test script designated in the unit testing test case on the target on the remote system, the functional test script designating a functional test case to be run on the target to test the operating of one or more functions of the target. The method is directed to calling, by the one or more processors, the software testing automation framework on the remote system to open a return interface. The method is directed to calling, by the one or more processors, the software testing automation framework on the remote system to copy the log file with the unique file name as a unit testing framework result. The method is directed to receiving, by the one or more processors, by the originating system, the unit testing framework case result for the unit testing test case converted by a software testing automation copy request within the unit testing test case from results of the function test script running on the target, wherein the results comprise a test log specifying one or more differences between a baseline specified in the functional test script designated in the unit testing test case and one or more actual results achieved during testing of the functional test script on the target.

In another embodiment, a computer program product comprises one or more non-transitory computer-readable storage devices and program instructions, stored on at least one of the one or more storage devices. The stored program instructions comprise program instructions to specify a unique file name for a log file for each execution of a unit testing test case. The stored program instructions comprise program instructions to specify, in the unit testing test case, a location of a functional test script. The stored program instructions comprise program instructions to specify, in the unit testing test case, the unique file name for the log file for use by a remote system. The stored program instructions comprise program instructions, responsive to starting the unit testing test case specified in a unit testing framework on an originating system for running on at least one target, to direct a software testing automation framework execute request within the unit testing test case to the remote system to execute the functional test script designated in the unit testing test case on the target on the remote system, the functional test script designating a functional test case to be run on the target to test the operating of one or more functions of the target. The stored program instructions comprise program instructions to call the software testing automation framework on the remote system to open a return interface. The stored program instructions comprise program instructions to call the software testing automation framework on the remote system to copy the log file with the unique file name as unit testing framework results. The stored program instructions comprise program instructions to receive, by the originating system, the unit testing framework case result for the unit testing test case converted by a software testing automation copy request within the unit testing test case from results of the function test script running on the target, wherein the results comprise a test log specifying one or more differences between a baseline specified in the functional test script designated in the unit testing test case and one or more actual results achieved during testing of the functional test script on the target.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 3 illustrates a block diagram of one example of types of instructions specified in a JUnit test case that encapsulates an RFT test script for remote target testing within a fully automated continuous integration test system;

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
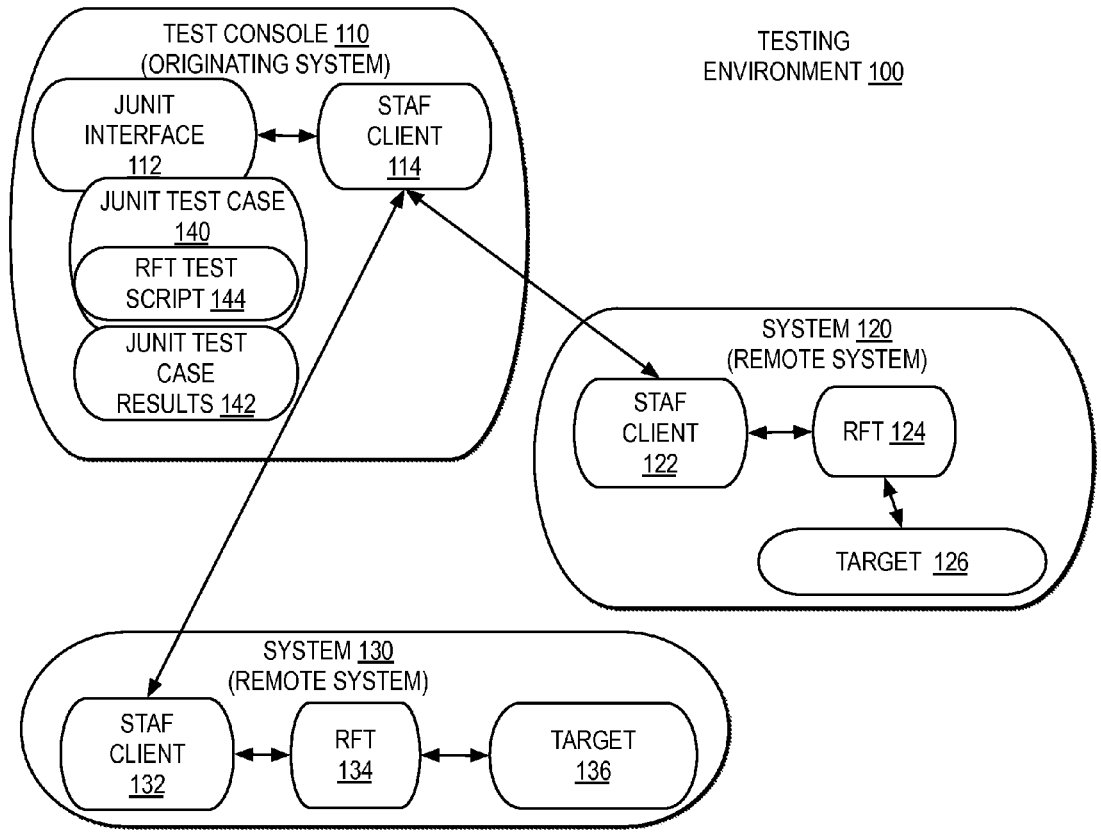
FIG. 1 illustrates a block diagram of one example of a fully automated continuous integration test system for facilitating testing of a remote target within a unit testing framework via a functional test script.

FIG. 1 illustrates a block diagram of one example of a fully automated continuous integration test system for facilitating testing of a remote target within a unit testing framework via a functional test script.

In the example, a testing environment 100 illustrates one example of a fully automated continuous integration test system for facilitating testing of a remote target that requires unit framework testing via a functional test script. As illustrated, testing environment 100 includes a test console 110, which may also be referred to as an originating system. In the example, a user or automated interface may select, via test console 110, to run one or more unit framework test cases, such as JUnit test case 140, on one or more targets on remote systems, such as target 126 on system 120 and target 136 on system 130. In the example, target 126 and target 136 may represent one or more software targets, such as web or server applications, stand-alone computing applications, web services, computer program products, user interfaces (UIs), or other executables that are tested while operating.

In the example, test console 110 includes a JUnit interface 112 for providing libraries, test windows, and other tools for supporting a unit testing framework in Java®. In one example JUnit interface 112 supports one or more interfaces through which a user or automated testing service may select to run a specific JUnit test case, such as JUnit test case 140 and through which JUnit test case 140 may pass command-line arguments. In one example, JUnit interface 112 represents a lightweight Java® based unit testing framework that provides support for execution of JUnit test cases, including libraries to support collection of the actions executed on a target by a test case and a determination of whether the actions match with expected results. In one example, a unit testing framework, such as JUnit, provides support for testing targets specified as methods, including private methods. In the example, the JUnit framework referred to is a unit testing framework implemented in the Java® programming language. In one example, JUnit test case 140 is a Java® object. In other embodiments, interfaces for other types of unit testing frameworks implemented in other programming languages may be implemented within test console 110.

In the example, JUnit interface 112 may be selected to run on test console 110 because JUnit interface 112 supports a lightweight unit testing framework, requiring minimal server space and server resources. In the example, the target to be tested may be on a remote system from test console 110 and the target application may need to be tested using a functional test, rather than a unit test case. For example, the remote target may require user interface (UI) testing via a functional test. In the example, while a unit testing framework supports method level testing, functional tests capture results on other layers of a target, including, but not limited to, a user interface layer. In the example, JUnit interface 112 alone does not support an automated test system for functional testing of a target on a remote system. In addition, in the example, while a functional testing service could be installed on test console 110 to handle execution of functional tests on remote servers, functional test services that provide testing on remote systems are not lightweight when compared with the JUnit interface 112, with functional testing services for remote test handling requiring additional, and significant, server space and server resources. A user may select to only install JUnit interface 112, rather than JUnit interface 112 and another functional testing service for remote target testing, on testing console 110 to minimize the testing framework load on the system hosting test console 110.

In the example, to implement a fully automated continuous integration test system for running a functional test on a remote target via a test console supporting a unit testing framework, whereby functional test scripts may be executed remotely encapsulated in the unit testing framework, testing environment 100 includes a remote testing automated framework interface between testing console 110 and each of the testing target remote systems and includes an functional test controller on each of the testing target remote systems.

In particular, in the example, the remote testing automated framework interface between testing console 110 and each of system 120 and system 130 is implemented through software testing automated framework (STAF) clients on each system, illustrated as STAF client 114 on test console 110, STAF client 122 on system 120, and STAF client 132 on system 130. STAF is an open source, multi-platform, multi-language, automation framework for managing automated test cases and environments through STAF services that provide a focused set of functionality, such as Logging and Process invocation. In one example, each of STAF client 114, STAF client 122, and STAF client 132 represent a STAF process running on each of the machines which accepts requests and routes requests to appropriate services. Requests to STAF clients may arrive from the local machine or from another STAF client running on another machine. STAF clients support an automated testing environment in which machines may make requests of services on other machines. STAF clients are useable from a variety of languages, including, but not limited to, Java®, C/C++, Rexx, and Perl, or from a command prompt. STAF clients are supported on multiple operating systems and STAF is an open source framework, such that STAF can be ported into any operating system.

In particular, in the example, the functional test controller on each of the testing target remote systems is implemented through a Rational Functional Tester (RFT), such as RFT 124 on system 120 and RFT 134 on system 130. RFT 124 and RFT 134 represent automated software tools that provide automated testing services for functional testing, which also includes regression testing, GUI testing, and data-driven testing, for example. In one example, RFT 124 and RFT 134 provide testing support for Java®, Web 2.0, SAP®, Siebel®, terminal-based and Microsoft® Visual Studio .NET Windows forms applications. In the example, each of RFT 124 and RFT 134 may represent or incorporate an RFT agent, a supporting Java® Runtime Environment (JRE), and additional supported browsers or other scripts for supporting playback of RFT test scripts.

In the example, RFT 124 and RFT 134 control playback of RFT scripts on targets. In addition, RFT 124 and RFT 134 collect results of each test script execution and generate test logs with entries reflecting potential errors detected during test script execution. In one example, each of RFT 124 and RFT 134 may generate a test log with entries reflecting potential errors detected during test script execution by comparing the system states for one or more objects detected in the results of each test script execution with baseline system states for one or more objects captured during the recording of the test script, and noting discrepancies between the tested results and the baseline, in the test log. In one example, an expected system state for an object may include a specific value in a field or a property of an object, such as enabled or disabled. RFT 124 and RFT 134 may implement additional functions or provide additional services during the playback of a test script and the detection of potential errors to minimize the impact of the error detection functions and avoid interruptions in RFT test script playback. For example, RFT 124 and RFT 134 may include additional functions that locate and manage changes to objects in the target applications that have occurred in the target applications since creation of the RFT test script for the target applications.

In particular, in the example, STAF client 114 may receive a request from JUnit interface 112 to execute JUnit test case 140 on one or more targets, and automatically route the request to the STAF client on the remote system hosting the target. For example, STAF client 114 may automatically route a request from JUnit interface 112 to execute JUnit test case 140 on target 126 to STAF client 122 and STAF client 114 may automatically route a request from JUnit interface 112 to execute JUnit test case 140 on target 136 to STAF client 132.

In the example, JUnit test case 140 may specify an RFT test script 144 to be executed on the remote target. In the example, RFT test script 144 may be stored in one or more locations, where RFT test script 144 specifies the network or other storage location of the RFT test script. RFT test script 144 may also be copied to the remote target through STAF requests.

STAF client 122 receives a request to execute RFT test script 144 and routes the request to RFT 124 to run on target 126. In the example, STAF client 132 receives a request to execute RFT test script 144 and routes the request to RFT 134 to run on target 126. In one example, RFT 124 and RFT 134 provide a command line interface for specifying playback of RFT test script 144, where STAF client 122 automatically calls RFT 124 via the command line interface to execute RFT test script 144 on target 126 and STAF client 132 automatically calls RFT 134 via the command line interface to execute RFT test script 144 on target 136. In particular, each STAF client may automatically pass a command for playback of a particular RFT test script to the command line interface of an RFT to trigger the automated playback of the particular RFT test script by the RFT on the target.

In addition, in the example, JUnit test case 140 may include a request to copy the log resulting from running RFT test script 144 back to JUnit interface 112. STAF client 114 passes a request to STAF client 122 to copy the log from running RFT test script 144 on target 126 back to test console 110 and STAF client 114 passes a request to STAF client 132 to copy the log from running RFT test script 144 on target 136 back to test console 110.

In the example, JUnit test case 140 may specify the automated copying of the RFT log results back to test console 110 from system 120 and system 130, as JUnit test case results 142, encapsulated in the unit testing framework. In particular, JUnit test case 140 may specify automatically parsing and evaluating the text of the RFT log results for errors by calling JUnit interface 112. If an error exists in the RFT log results in JUnit test case results 142, JUnit test case 140 may be marked as including an error and the RFT log results encapsulated in JUnit test case results 142 may be copied into a JUnit report including the JUnit test case results of any JUnit test cases with results that include errors.

In particular, in the example, JUnit interface 112 provides support for automatically amalgamating the JUnit test case results collected from running multiple JUnit test cases, including one or more JUnit test cases that encapsulate RFT test scripts run on remote targets, into JUnit test case reports that indicate which JUnit test cases include potential errors. In the example, if a separate functional testing service were installed on test console 110 to control testing of RFT test scripts on remote targets, in addition to the functional testing service increasing the software load on testing console 110, the RFT log results collected by the functional testing service could not be amalgamated with other JUnit test case results without including additional services to perform additional conversion steps.

One function of an automated testing framework is that the framework needs to report to a user whether each test case passes or whether the test case includes results that indicate potential errors. In the example, each of JUnit, STAF, and RFT provide services, which when continuously integrated, provide for automated execution of an RFT test script as a JUnit test case on a remote target and automated return of the RFT log results from testing an RFT test script on a remote target as JUnit test case results.

In an example where a user needs to run a large batch of test cases on multiple remote targets, testing environment 100 illustrates a lightweight, fully automated continuous integration test system for providing a single, lightweight interface through which a user may schedule multiple test cases, including unit test cases and functional test cases encapsulated in unit test cases, on multiple remote targets and receive an amalgamated set of results reporting the unit test cases that returned errors. In the example where a user needs to run a large batch of test cases, returning the results of each test case in a form that allows for automatic amalgamation of the results into a JUnit test case report, without additional conversions, provides the user a fully automated testing system for efficiently analyzing the results of test cases.

Figure 2:
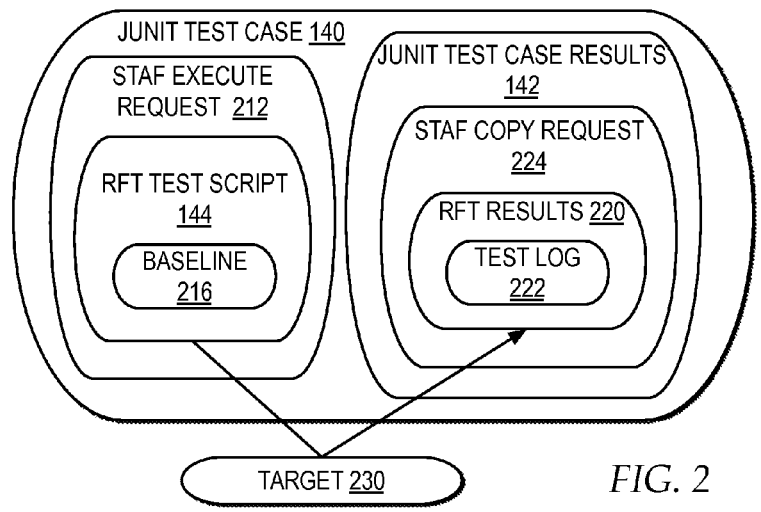
FIG. 2 illustrates a block diagram of one example of an RFT test script encapsulated in a JUnit test case for automated execution of the RFT test script on a remote target, within the JUnit test framework.

FIG. 2 illustrates a block diagram of an RFT test script encapsulated in a JUnit test case for execution of the RFT test script on a remote target, within the JUnit test framework.

In the example, JUnit test case 140 is a test case specified within the JUnit framework for one or more applications, where instances of the application on which test case is run are referred to as targets, such as target 230. In the example, for automating execution of JUnit test case 140 within testing environment 100, JUnit test case 140 includes a software testing automation framework (STAF) execute request 212 from an originating system to a remote system to execute RFT test script 144 on the remote system.

In the example, RFT test script 144 specifies a functional test case to run on a remote target 230 to test the operation of one or more functions of target 230. In one example, RFT test script 144 represents a Java® or Visual Basic® application. In one example, a test recorder initially captures one or more user actions performed against the application under test and the test recorder creates RFT test script 144 from the captured actions. In addition, the test recorder may capture, and a user may separately specify, a baseline 216 of one or more expected system states of one or more objects for the application under test. Once RFT test script 144 is created, RFT test script 144 is reusable across multiple instances of the application referred to as target 230, on one or more systems. RFT test script 144 may also represent multiple RFT test scripts run in a batch mode where several test scripts are grouped together and run.

In the example, as RFT test script 144 runs on target 230, RFT results 220 are produced by an RFT, including a test log 222 that includes a record of any discrepancies between baseline 216 and the actual results achieved during testing of RFT test script 144 on target 230. In the example, JUnit test case 110 includes a STAF copy request 224 for copying test log 222 from the remote system to the originating system. JUnit test case 110 specifies that the originating system receives RFT test log 222, including the errors results from testing RFT test script 144 on target 230 on a remote system, determines whether RFT test log 222 includes any errors, and converts RFT test log 222 into JUnit test case results 142.

FIG. 3 illustrates an illustrative diagram of one example of types of instructions specified in a JUnit test case that encapsulates an RFT test script for remote target testing within a fully automated continuous integration test system.

In the example, JUnit test case code 300 includes is initially defined as a Java® object by "public void runRFTest(String scriptName, String args) throws Exception". In the example, JUnit test case code 300 may refer to one or more libraries of JUnit interface 112 for testing services.

In the example, as illustrated at reference numeral 310, JUnit test case code 330 includes instructions for setting the unique file name for the log file for each execution of the JUnit test case by "SimpleDateFormat format=newSimpleDateFormat("yyyyMMddHHmmss"); Date date=new Date( ); String nowStr=format.format(date); Logger.getRootLogger( ).info("Logfile is"+nowStr)".

In the example, as illustrated at reference numeral 312, JUnit test case code 330 includes instructions for specifying the RFT command to be executed on the remote machine, by "String cmd="java-classpath C:\\\\Progra~1\\\\FUNCTI~1\\\\bin\\\\rational_ft.jr com.rational.test.ft.rational_ft", and including a location of a specified RFT script for playback of "C:\\\\DOCUME~1\\\\rationalsdp\\\\\workspace\\\\-playback"+scriptName+"", an option set not to show the RFT log viewer at the end of the test script playback of "-rt.bring_up_logviewer\\\"false\\\"", an output log file in a text format of "-rt.log_format text", and an output log file specified to the unique file name of "-log "+nowStr".

In the example, as illustrated at reference numeral 314, JUnit test case code 300 includes instructions that specify that if the RFT target fails in any way during testing, the failure will be included in the RFT log file. In other embodiments, JUnit test case code 300 may include instructions that specify the types of failures to include in the RFT log file.

In the example, as illustrated at reference numeral 316, JUnit test case code 300 includes a call to STAF requesting the RFT test script execution on the remote system of "STAFProcess.execute (cmd, fTarget.getAddress( ))". In the example, as illustrated at reference numeral 312, "cmd" has been set to the RFT test script to be executed and fTarget.getAddress( ) specifies the call to pass the address of the target. In addition, in the example, the STAFProcess execute instruction instructs the STAF client on the remote system to pass command line arguments to the RFT for automating playback of the specified RFT test script.

As illustrated at reference numeral 318, JUnit test case code 300 also includes a call to STAF specifying a return interface for returning the log file generated from executing the requested RFT test script of "STAFFSInterface fs=new STAFFSInterface( )". As illustrated at reference numeral 320, JUnit test case code 300 includes an instruction specify the location of the log file, specified with the unique file name, on the remote system of "String path="C: \\\\DOCUME~1\\\\rationalsdp\\\\workspace\\\\_logs\\\\"+ nowStr+\\\\rational_ft_log.txt".

As illustrated at reference numeral 322, JUnit test case code 300 includes an instruction for calling the STAF return interface to copy the RFT log file at the specified "path" location back to the test console of "String results=fs.getTextFile(fTarget, path)".

As illustrated at reference numeral 324, JUnit test case code 300 includes instructions for examining the content of the RFT log file for text indicating a failed signature and outputting, if the RFT log file indicates a failed signature, the failed RFT log file is converted into a JUnit test case results marked with errors "if (results.contains(RFT_FAIL_CHAR_SEQUENCE)){Logger.getLogger (RFTTestSuite.class).error (results); fail ("RFT TestScript Failed—"+results)". In other examples, the instructions illustrated at reference numeral 324 may include additional or alternate output indicators and may include additional or alternate instructions for automated examination of the contents of the JUnit test case results.

Figure 4:
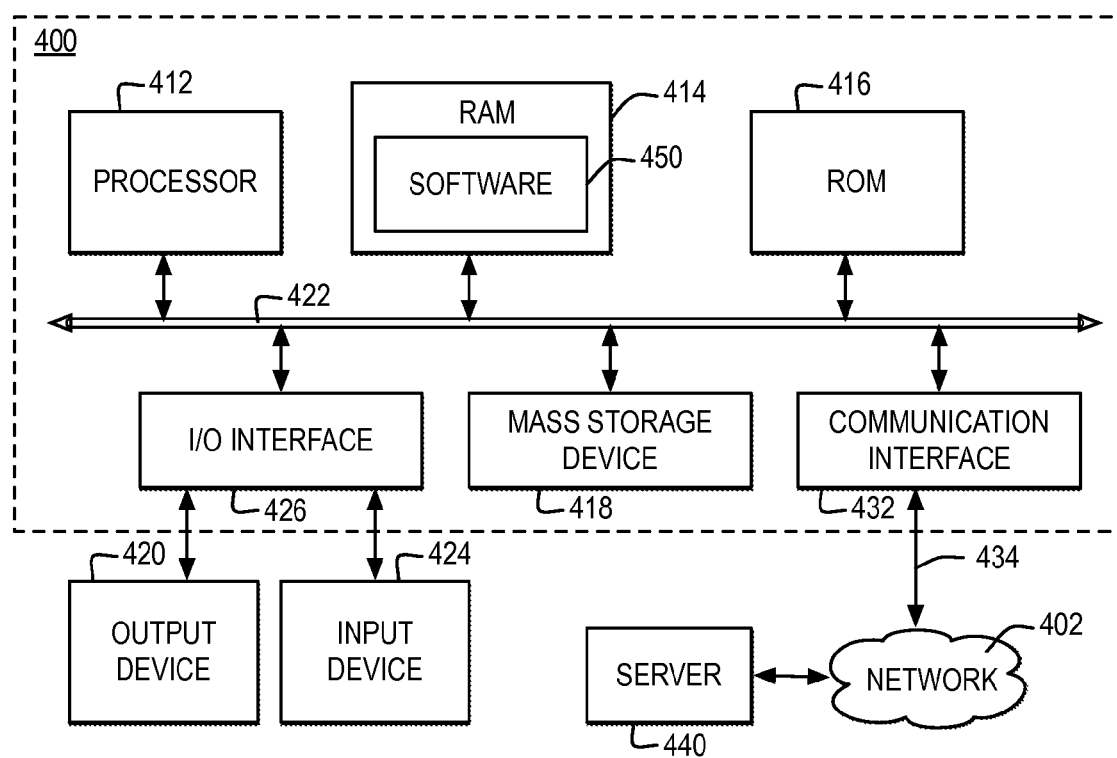
FIG. 4 illustrates a block diagram of one example of a computer system in which one embodiment of the invention may be implemented.

FIG. 4 illustrates a block diagram of one example of a computer system in which one embodiment of the invention may be implemented. The present invention, including, but not limited to, test console 110, system 120, and system 130 may be performed in a variety of systems and combinations of systems, made up of functional components, such as the functional components described with reference to a computer system 400 and may be communicatively connected to a network, such as network 402.

Computer system 400 includes a bus 422 or other communication device for communicating information within computer system 400, and at least one hardware processing device, such as processor 412, coupled to bus 422 for processing information. Bus 422 preferably includes low-latency and higher latency paths that are connected by bridges and adapters and controlled within computer system 400 by multiple bus controllers. When implemented as a server or node, computer system 400 may include multiple processors designed to improve network servicing power. Where multiple processors share bus 422, additional controllers (not depicted) for managing bus access and locks may be implemented.

Processor 412 may be at least one general-purpose processor such as IBM® PowerPC® processor that, during normal operation, processes data under the control of software 450, which may include at least one of application software, an operating system, middleware, and other code and computer executable programs accessible from a dynamic storage device such as random access memory (RAM) 414, a static storage device such as Read Only Memory (ROM) 416, a data storage device, such as mass storage device 418, or other data storage medium. Software 450 may include, but is not limited to, code, applications, protocols, interfaces, and processes for controlling one or more systems within a network including, but not limited to, an adapter, a switch, a server, a cluster system, and a grid environment.

Figure 5:
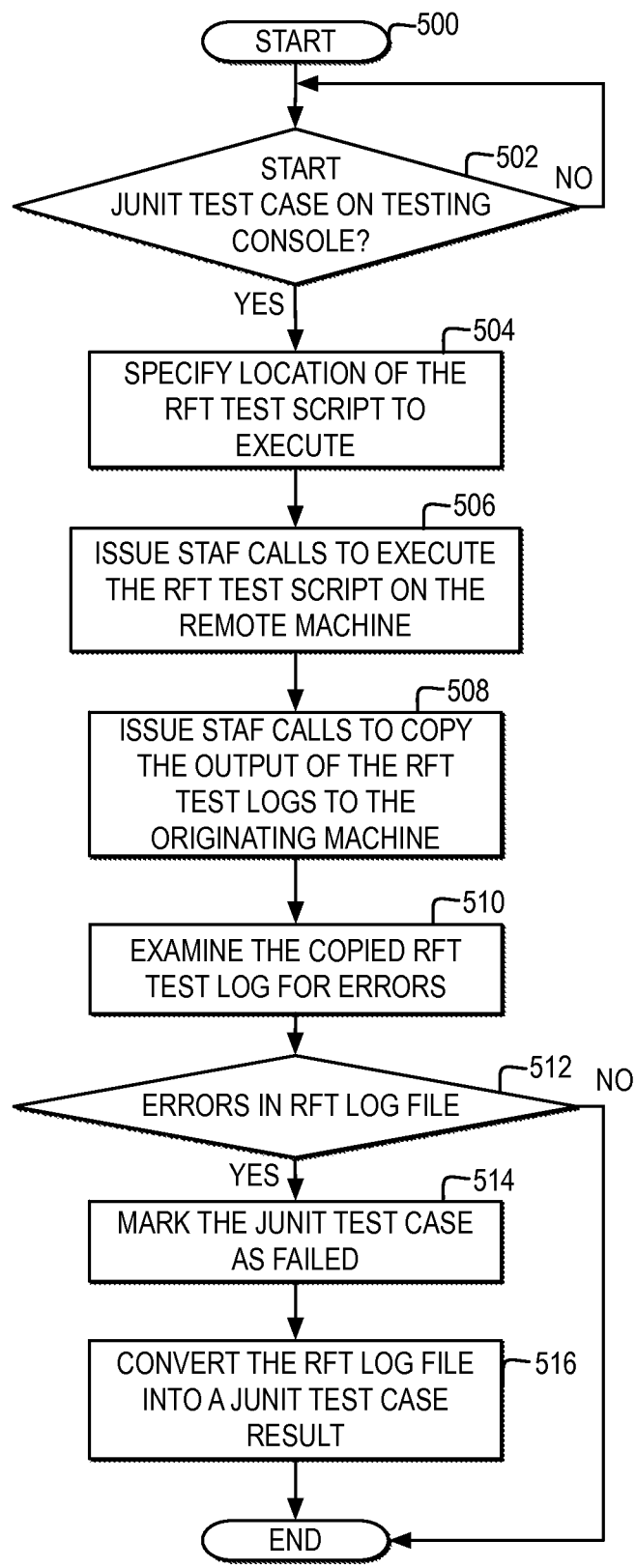
FIG. 5 illustrates one example of a high level logic flowchart of a process and program for controlling a unit testing framework of a fully automated continuous integration testing system for executing an RFT test script integrated into a JUnit test case on a remote target.
Figure 6:
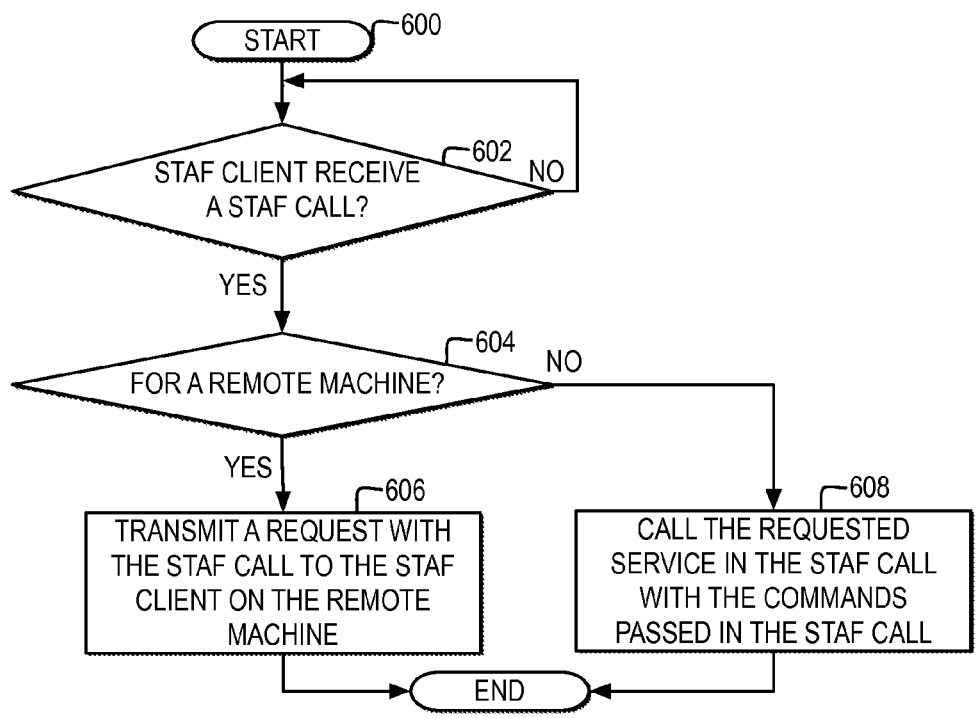
FIG. 6 illustrates one example of a high level logic flowchart of a process and program for controlling a remote automated testing framework of a fully automated continuous integration testing system for executing a RFT test script as a JUnit test case, on a remote target.
Figure 7:
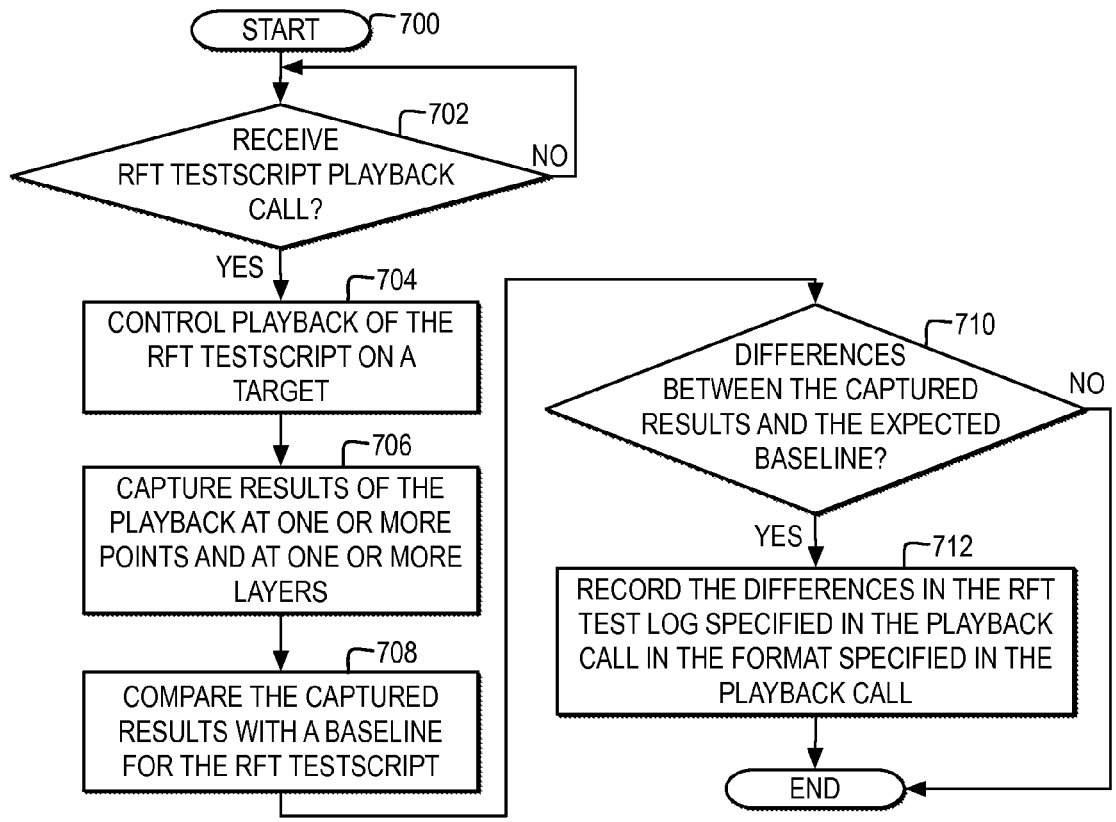
FIG. 7 illustrates one example of a high level logic flowchart of a process and program for controlling a functional testing framework of a fully automated continuous integration testing system for executing a RFT test script as a JUnit test case, on a remote target.

In one embodiment, the operations performed by processor 412 may control the operations of flowchart of FIGS. 5-7 and other operations described herein. Operations performed by processor 412 may be requested by software 450 or other code or the steps of one embodiment of the invention might be performed by specific hardware components that contain hardwired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, micro-code, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 418, a random access memory (RAM), such as RAM 414, a read-only memory (ROM) 416, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, such as computer system 400, partly on the user's computer, as a stand-alone software package, partly on the user's computer and partly on a remote computer or entirely on the remote computer or server, such as server 440. In the latter scenario, the remote computer may be connected to the user's computer through any type of network, such as network 402, through a communication interface, such as network interface 432, over a network link that may be connected, for example, to network 402.

In the example, network interface 432 includes an adapter 434 for connecting computer system 400 to network 402 through a link and for communicatively connecting computer system 400 to server 440 or other computing systems via network 402. Although not depicted, network interface 432 may include additional software, such as device drivers, additional hardware and other controllers that enable communication. When implemented as a server, computer system 400 may include multiple communication interfaces accessible via multiple peripheral component interconnect (PCI) bus bridges connected to an input/output controller, for example. In this manner, computer system 400 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 400, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 400, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 432, the network link to network 402, and network 402 may use electrical, electromagnetic, or optical signals that carry digital data streams. The signals through the various networks and the signals on network 402, the network link to network 402, and network interface 432 which carry the digital data to and from computer system 400, may be forms of carrier waves transporting the information.

In addition, computer system 400 may include multiple peripheral components that facilitate input and output. These peripheral components are connected to multiple controllers, adapters, and expansion slots, such as input/output (I/O) interface 426, coupled to one of the multiple levels of bus 422. For example, input device 424 may include, for example, a microphone, a video capture device, an image scanning system, a keyboard, a mouse, or other input peripheral device, communicatively enabled on bus 422 via I/O interface 426 controlling inputs. In addition, for example, output device 420 communicatively enabled on bus 422 via I/O interface 426 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 4 may vary. Furthermore, those of ordinary skill in the art will appreciate that the depicted example is not meant to imply architectural limitations with respect to the present invention.

FIG. 5 illustrates a high level logic flowchart of a process and program for controlling a unit testing framework of a fully automated continuous integration testing system for executing an RFT test script integrated into a JUnit test case on a remote target. As illustrated, the process starts at block 500 and thereafter proceeds to block 502. Block 502 illustrates a determination whether a JUnit test case on a testing console is started. At block 502, if a JUnit test case is started on a testing console, then the process passes to block 504. Block 504 illustrates specifying the location of the RFT test script to execute. Next, block 506 illustrates issuing STAF calls to execute the RFT test script on the remote machine. Thereafter, block 508 illustrates issuing STAF calls to copy the output of the RFT test log to the originating machine. Next, block 510 illustrates examining the copied RFT test log for errors. Thereafter, block 512 illustrates a determination whether there are errors indicated in the RFT log file. At block 512, if there are errors indicated in the RFT log file, then the process passes to block 514. Block 514 illustrates marking the JUnit test case as failed. Next, block 516 illustrates converting the RFT log file into a JUnit test case result, and the process ends. In one example, a JUnit interface of the testing console may automatically output a status of the JUnit test case as failed and automatically amalgamate the RFT log file in the JUnit test case result in a report with other results from failed JUnit test cases. At block 512, if there are not any errors indicated in the RFT log file, then the process ends. In one example, a JUnit interface of the testing console may automatically output a status of the JUnit test case as "completed" when the process ends, where if the JUnit test case completes without being marked as failed at block 514, the JUnit interface may automatically identify the JUnit test case as having passed.

FIG. 6 illustrates a high level logic flowchart of a process and program for controlling a remote automated testing framework of a fully automated continuous integration testing system for executing a RFT test script as a JUnit test case, on a remote target. As illustrated, the process starts at block 600 and thereafter proceeds to block 602. Block 602 illustrates a determination whether a STAF client receives a STAF call. In the example, a STAF call represents a call to a remote automated testing framework, such as STAF, where each machine runs a client that manages calls to the remote automated testing framework, such as a STAF client. In the example, the remote automated testing framework, such as STAF, provides a framework for automatically performing the steps illustrated in FIG. 6 to provide a fully automated continuous integration testing system for executing an RFT test script as a JUnit test case, on a remote target. At block 602, if a client receives a STAF call, the process passes to block 604. Block 604 illustrates a determination of whether the call is for a remote machine. At block 604, if the call is for a remote machine, then the process passes to block 606.

Block 606 illustrates transmitting a request with the STAF call to the STAF client on the remote machine, and the process ends. Returning to block 604, if the call is not for a remote machine, then the process passes to block 608. Block 608 illustrates calling the requested service in the STAF call with commands passed in the STAF call, and the process ends.

FIG. 7 illustrates a high level logic flowchart of a process and program for controlling a functional testing framework of a fully automated continuous integration testing system for executing a RFT test script as a JUnit test case, on a remote target. As illustrated, the process starts at block 700 and thereafter proceeds to block 702. Block 702 illustrates a determination whether a functional testing framework interface, such as RFT, receives an RFT test script playback call. In the example, an RFT test script playback call represents a call to a functional testing framework, such as RFT, to playback a functional test, such as an RFT test script. In the example, the functional testing framework, such as RFT, provides a framework for automatically performing the steps illustrated in FIG. 7 to provide a fully automated continuous integration testing system for executing an RFT test script as a JUnit test case, on a remote target. At block 702, if an RFT test script playback call is received at a functional testing framework interface, then the process passes to block 704. Block 704 illustrates controlling playback of the RFT test script on a target. Next, block 706 illustrates capturing results of the playback at one or more points and at one or more layers. Thereafter, block 708 illustrates comparing the captured results with a baseline for the RFT test script, where the baseline specifies one or more expected results. Next, block 710 illustrates a determination whether there are differences between the captured results and the expected baseline. At block 710, if there are not any differences, then the process ends. At block 710, if there are differences between the captured results and the expected baseline, then the process passes to block 712. Block 712 illustrates recording the differences in the RFT test log specified in the playback call in the format specified in the playback call, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:
   program instructions to specify a unique file name for a log file for each execution of a unit testing test case;
   program instructions to specify, in the unit testing test case, a location of a functional test script;
   program instructions to specify, in the unit testing test case, the unique file name for the log file for use by a remote system;
   program instructions, responsive to starting the unit testing test case specified in a unit testing framework on an originating system for running on at least one target, to direct a software testing automation framework execute request within the unit testing test case to the remote system to execute the functional test script designated in the unit testing test case on the target on the remote system, the functional test script designating a functional test case to be run on the target to test the operating of one or more functions of the target;
   program instructions to call the software testing automation framework on the remote system to open a return interface;
   program instructions to call the software testing automation framework on the remote system to copy the log file with the unique file name as unit testing framework results; and
   program instructions to receive, by the originating system, the unit testing framework case result for the unit testing test case converted by a software testing automation copy request within the unit testing test case from results of the function test script running on the target, wherein the results comprise a test log specifying one or more differences between a baseline specified in the functional test script designated in the unit testing test case and one or more actual results achieved during testing of the functional test script on the target.

2. The computer system according to claim 1, the stored program instructions further comprising:
program instructions to automatically copy the functional test script specified in the unit testing test case from the originating system to the remote system through a remote testing automation framework.

3. The computer system according to claim 2, the stored program instructions further comprising:
program instructions to provide the remote testing automation framework on the originating system through a software testing automated framework client process running on the originating system;
program instructions to provide the remote testing automation framework on the remote system through a second software testing automated framework client process running on the remote system; and
program instructions to automatically issue a call to the remote testing automation framework on the originating system by passing the software testing automation framework execution request to the software testing automated framework client to execute the functional test script specified in the unit testing framework test case through a functional testing framework on the target on the remote system, wherein the software testing automated framework client passes the software testing automation framework execution request to the second software testing automated framework client and where the second software testing automated framework calls the functional test framework to execute the command request by entering the playback command for the functional test script in a command line interface of the functional test framework.

4. The computer system according to claim 1, the stored program instructions further comprising:
program instructions to automatically evaluate, at the originating system, whether the test log comprises at least one error by automatically evaluating, under the unit testing framework, whether the test log comprises at least one error by examining the text in the test log for at least one failure signature, wherein the functional testing framework controls playback of the functional test script on the target, captures results of the playback of the functional test script on the target, compares the captured results with a baseline expected result for the functional test script, and records a difference between the captured results and the baseline expected results as an error in the test log.

5. The computer system according to claim 1, the stored program instructions further comprising:
program instructions to automatically convert the test log from a functional test log in a format applied by the functional test script into the unit testing framework test case result in a format applied by the unit testing framework.

6. The computer system according to claim 5, the stored program instructions further comprising:
program instructions to automatically amalgamate the test log in the unit testing framework test case result into a unit testing framework report comprising a plurality of unit testing framework test case results.

7. A method comprising:
specifying, by one or more processors, a unique file name for a log file for each execution of a unit testing test case;
specifying, by the one or more processors, in the unit testing test case, a location of a functional test script;
specifying, by the one or more processors, in the unit testing test case, the unique file name for the log file for use by a remote system;
responsive to starting the unit testing test case specified in a unit testing framework on an originating system for running on at least one target, directing, by the one or more processors, a software testing automation framework execute request within the unit testing test case to the remote system to execute the functional test script designated in the unit testing test case on the target on the remote system, the functional test script designating a functional test case to be run on the target to test the operating of one or more functions of the target; and
calling, by the one or more processors, the software testing automation framework on the remote system to open a return interface;
calling, by the one or more processors, the software testing automation framework on the remote system to copy the log file with the unique file name as a unit testing framework result; and
receiving, by the one or more processors, by the originating system, the unit testing framework case result for the unit testing test case converted by a software testing automation copy request within the unit testing test case from results of the function test script running on the target, wherein the results comprise a test log specifying one or more differences between a baseline specified in the functional test script designated in the unit testing test case and one or more actual results achieved during testing of the functional test script on the target.

8. The method according to claim 7, the method further comprising:
automatically copying, by the one or more processors, the functional test script specified in the unit testing test case from the originating system to the remote system through a remote testing automation framework.

9. The method according to claim 8, the method further comprising:
providing, by the one or more processors, the remote testing automation framework on the originating system through a software testing automated framework client process running on the originating system;
providing, by the one or more processors, the remote testing automation framework on the remote system through a second software testing automated framework client process running on the remote system; and
automatically issuing, by the one or more processors, a call to the remote testing automation framework on the originating system by passing the software testing automation framework execution request to the software testing automated framework client to execute the functional test script specified in the unit testing framework test case through a functional testing framework on the target on the remote system, wherein the software testing automated framework client passes the software testing automation framework execution request to the second software testing automated framework client and where the second software testing automated framework calls the functional test framework to execute the command request by entering the playback command for the functional test script in a command line interface of the functional test framework.

10. The method according to claim 7, the method further comprising:

automatically evaluating, by the one or more processors, whether the test log comprises at least one error by automatically evaluating, under the unit testing framework, whether the test log comprises at least one error by examining the text in the test log for at least one failure signature, wherein the functional testing framework controls playback of the functional test script on the target, captures results of the playback of the functional test script on the target, compares the captured results with a baseline expected result for the functional test script, and records a difference between the captured results and the baseline expected results as an error in the test log.

11. The method according to claim 7, the method further comprising:

automatically converting, by the one or more processors, the test log from a functional test log in a format applied by the functional test script into the unit testing framework test case result in a format applied by the unit testing framework.

12. The method according to claim 11, the method further comprising:

automatically amalgamating, by the one or more processors, the test log in the unit testing framework test case result into a unit testing framework report comprising a plurality of unit testing framework test case results.

13. A computer program product comprising one or more non-transitory computer-readable storage devices and program instructions, stored on at least one of the one or more storage devices, the stored program instructions comprising:

program instructions to specify a unique file name for a log file for each execution of a unit testing test case;

program instructions to specify, in the unit testing test case, a location of a functional test script;

program instructions to specify, in the unit testing test case, the unique file name for the log file for use by a remote system;

program instructions, responsive to starting the unit testing test case specified in a unit testing framework on an originating system for running on at least one target, to direct a software testing automation framework execute request within the unit testing test case to the remote system to execute the functional test script designated in the unit testing test case on the target on the remote system, the functional test script designating a functional test case to be run on the target to test the operating of one or more functions of the target;

program instructions to call the software testing automation framework on the remote system to open a return interface;

program instructions to call the software testing automation framework on the remote system to copy the log file with the unique file name as a unit testing framework result; and program instructions to receive, by the originating system, the unit testing framework case result for the unit testing test case converted by a software testing automation copy request within the unit testing test case from results of the function test script running on the target, wherein the results comprise a test log specifying one or more differences between a baseline specified in the functional test script designated in the unit testing test case and one or more actual results achieved during testing of the functional test script on the target.

14. The computer program product according to claim 13, the stored program instructions further comprising:

program instructions to automatically copy the functional test script specified in the unit testing test case from the originating system to the remote system through a remote testing automation framework.

15. The computer program product according to claim 14, the stored program instructions further comprising:

program instructions to provide the remote testing automation framework on the originating system through a software testing automated framework client process running on the originating system;

program instructions to provide the remote testing automation framework on the remote system through a second software testing automated framework client process running on the remote system; and program instructions to automatically issue a call to the remote testing automation framework on the originating system by passing the software testing automation framework execution request to the software testing automated framework client to execute the functional test script specified in the unit testing framework test case through a functional testing framework on the target on the remote system, wherein the software testing automated framework client passes the software testing automation framework execution request to the second software testing automated framework client and where the second software testing automated framework calls the functional test framework to execute the command request by entering the playback command for the functional test script in a command line interface of the functional test framework.

16. The computer program product according to claim 13, the stored program instructions further comprising:

program instructions to automatically evaluate, at the originating system, whether the test log comprises at least one error by automatically evaluating, under the unit testing framework, whether the test log comprises at least one error by examining the text in the test log for at least one failure signature, wherein the functional testing framework controls playback of the functional test script on the target, captures results of the playback of the functional test script on the target, compares the captured results with a baseline expected result for the functional test script, and records a difference between the captured results and the baseline expected results as an error in the test log.

17. The computer program product according to claim 13, the stored program instructions further comprising:

program instructions to automatically convert the test log from a functional test log in a format applied by the functional test script into the unit testing framework test case result in a format applied by the unit testing framework.

18. The computer program product according to claim 13, the stored program instructions further comprising:

program instructions to automatically amalgamate the test log in the unit testing framework test case result into a unit testing framework report comprising a plurality of unit testing framework test case results.

\* \* \* \* \*